United States Patent
Kersh et al.

(10) Patent No.: US 10,061,537 B2
(45) Date of Patent: Aug. 28, 2018

(54) DATA REORDERING USING BUFFERS AND MEMORY

(71) Applicant: Microsoft Technology Licensing, LLC, Redmond, WA (US)

(72) Inventors: Michael Kersh, Redmond, WA (US); Ryan Haraden, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/826,031

(22) Filed: Aug. 13, 2015

(65) Prior Publication Data
US 2017/0046101 A1  Feb. 16, 2017

(51) Int. Cl.
| | |
|---|---|
| *G06F 13/40* | (2006.01) |
| *G06F 3/06* | (2006.01) |
| *G06F 5/06* | (2006.01) |
| *G06T 1/60* | (2006.01) |
| *H04N 19/423* | (2014.01) |

(52) U.S. Cl.
CPC .......... *G06F 3/0656* (2013.01); *G06F 3/0604* (2013.01); *G06F 3/065* (2013.01); *G06F 3/0683* (2013.01); *G06F 5/065* (2013.01); *G06F 13/4013* (2013.01); *G06T 1/60* (2013.01); *H04N 19/423* (2014.11)

(58) Field of Classification Search
USPC ................................................. 345/547, 558
See application file for complete search history.

(56) References Cited

U.S. PATENT DOCUMENTS

| | | | |
|---|---|---|---|
| 4,825,301 A | | 4/1989 | Pape et al. |
| 5,007,001 A | | 4/1991 | Lloyd-Williams |
| 5,446,560 A | | 8/1995 | Schwartz |
| 5,692,159 A | | 11/1997 | Shand |
| 5,852,451 A | | 12/1998 | Cox et al. |
| 6,002,412 A | * | 12/1999 | Schinnerer ............ G09G 5/393 |
| | | | 345/520 |

(Continued)

FOREIGN PATENT DOCUMENTS

EP   0 299 228 A2   1/1989

OTHER PUBLICATIONS

International Search Report and Written Opinion for PCT/US2016/042700, dated Oct. 31, 2016, 10 pages.

(Continued)

*Primary Examiner* — Diane Wills
(74) *Attorney, Agent, or Firm* — Klarquist Sparkman, LLP

(57) ABSTRACT

Apparatus and methods are disclosed for reordering data received in a non-contiguous order into a contiguous order. In one example of the disclosed technology, an apparatus includes a number of input buffers comprising at least a first, first-in first-out (FIFO) input buffer and a second FIFO input buffer, a number of FIFO output buffers, and a reorder unit configured to store a first portion of non-contiguous data received from an image sensor in the first input buffer, store a second portion of the received data in the second FIFO input buffer, store a respective pixel of data output by the first and second FIFO input buffers at a first address location in the memory, and traverse the memory according to an order to store the respective pixels in a FIFO output buffer. The apparatus can thus be used to reorder pixel data prior to further image processing.

24 Claims, 11 Drawing Sheets

(56) References Cited

U.S. PATENT DOCUMENTS

| | | | |
|---|---|---|---|
| 6,734,868 | B2 | 5/2004 | Gornstein et al. |
| 7,372,975 | B2 | 5/2008 | Avidan et al. |
| 8,552,957 | B2 | 10/2013 | Hotelling |
| 8,665,485 | B2 | 3/2014 | Mantell |
| 2003/0043173 | A1 | 3/2003 | Wasserman et al. |
| 2004/0153936 | A1 | 8/2004 | Smith et al. |
| 2004/0233324 | A1 | 11/2004 | Galambos et al. |
| 2005/0280653 | A1* | 12/2005 | Tsukamoto ............ G09G 5/001 345/558 |
| 2014/0254929 | A1 | 9/2014 | Wu et al. |

OTHER PUBLICATIONS

"ADC Snap Tetracam's Ultra-Fast 90 Gram Multi-spectral Imaging System with Electronic Global Snap Shutter," 8 pages, retrieved May 1, 2015, Available at: http://www.tetracam.com/New%202014%20Web%20Site/Products-ADC_Snap.htm.

Ciavarella et al., "Lossless Image Compression Using Pixel Reordering," In Proceedings of Twenty-Seventh Australasian Computer Science Conference, vol. 26, Jan. 2004, 8 pages.

Fujiwara et al., "A Two-Port SRAM for Real-Time Video Processor Saving 53% of Bitline Power with Majority Logic and Data-Bit Reordering," In Proceedings of the International Symposium on Low Power Electronics and Design, Oct. 4, 2006, 6 pages.

Rister et al., "A Fast and Efficient Sift Detector Using the Mobile GPU," In Proceedings of the IEEE International Conference on Acoustics, Speech and Signal Processing, May 26, 2013, 5 pages.

Texas Instruments, "FIFO Architecture, Functions, and Applications SCAA042A," Nov. 1999, pp. 1-34.

International Preliminary Report on Patentability for PCT/US2016/042700, dated Jul. 7, 2017, pp. 1-12.

\* cited by examiner

DATA REORDERING USING BUFFERS AND MEMORY

BACKGROUND

Sensors and other electronic components produce data as pixels that can be further processed using central processing units (CPUs). Pixel data from image sensors can be sent in raster order to a CPU using a Mobile Processor Industry Interface format. The CPU can perform image processing operations on the pixel data. Such pixel-based image sensors can be incorporated into various consumer products such as cameras, motion sensors, smart phones, automobiles, and tablets.

SUMMARY

Methods, apparatus, and computer-readable storage media are disclosed for performing data reordering operations on a stream of received data. In some examples, non-contiguous pixel data received from an image sensor are processed using a number of FIFO buffers and memory to be reordered into a raster order. By performing reordering operations using the disclosed techniques, system performance can be improved and/or energy usage reduced while also allowing for general processing resources in the system to be applied to performing other operations.

In some examples of the disclosed technology, an apparatus with a reorder unit configured to reorder data received from a data stream into a contiguous ordering includes a plurality of input buffers, each of the input buffers being configured to output data in a first-in, first-out (FIFO) order, a memory, and a plurality of output FIFO buffers. The reorder unit is configured to control the buffers and memory in order to perform reordering operations disclosed herein, and hence can output data according to a new, contiguous ordering.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed embodiments will become more apparent from the following detailed description, which proceeds with reference to the accompanying figures.

DETAILED DESCRIPTION

I. General Considerations

Figure 1:
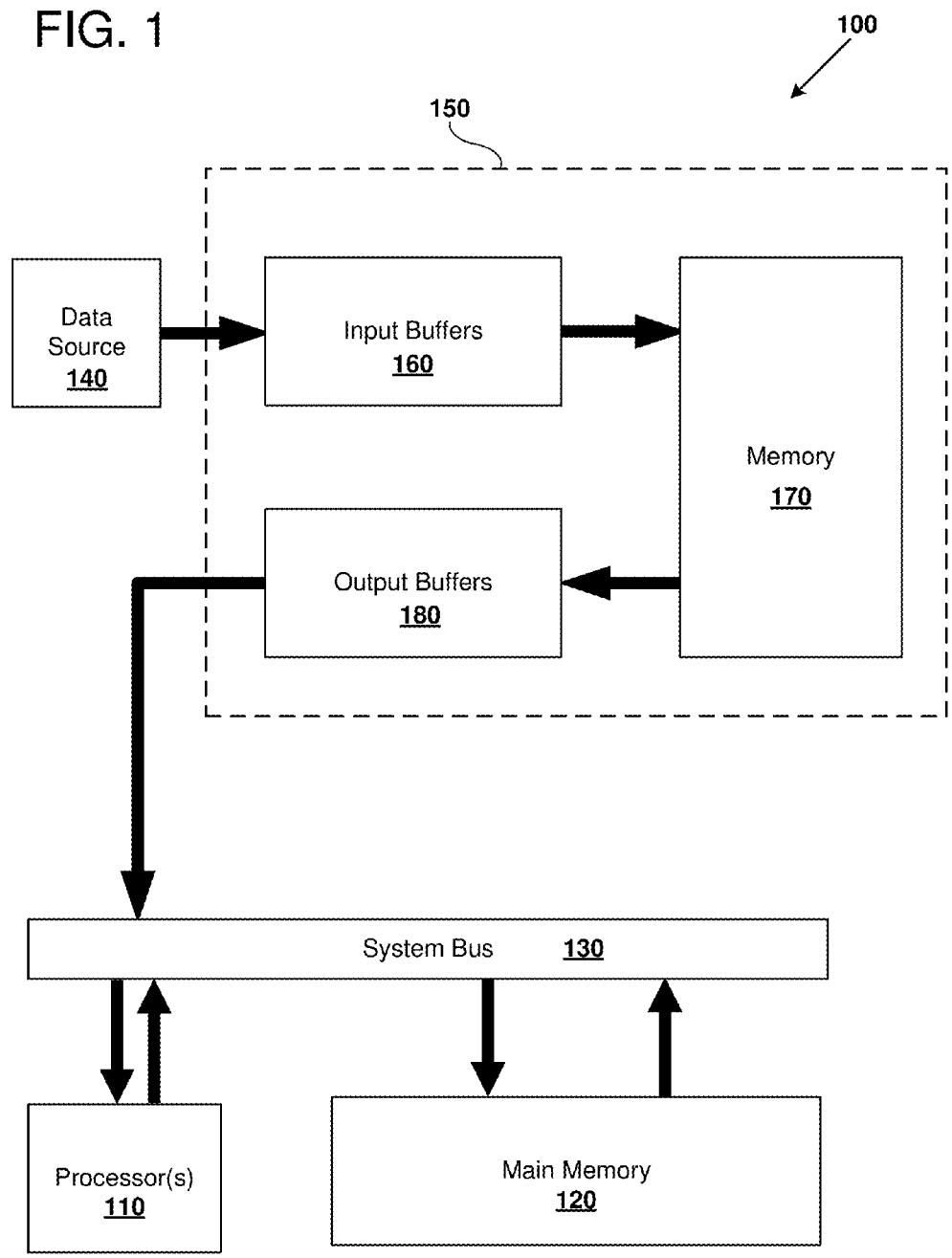
FIG. 1 is a block diagram that outlines an exemplary computing environment, as can be used in certain examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "store," "reorder," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application, or a software application that is accessed or downloaded via a web browser or other software application (such as a remote computing application). Such software can be executed, for example, on a single local computer (e.g., a thread executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technology

It is often desirable data received from real world sensors, for example pixel data received from image sensors, to be sent from the sensor in a non-raster order for each row of the sensor. For example, ordering pixels in a non-contiguous order can reduce power consumption and/or improve performance of such sensors. However, image processing techniques applied to such pixel data typically are performed on pixels that are arranged in contiguous (e.g., raster) order. Certain apparatus and methods disclosed herein allow for ordering of pixels or other such sensor data into a different order using power- and/or space-efficient hardware. Thus, it is desirable in many applications to reduce power consumption by supporting transfer and conversion of information in a non-raster order into a raster order for further downstream processing. In some examples, the apparatus and/or methods are generic in nature but can be applied to different arbitrary orderings of such data that may exhibit complicated, yet regular, patterns.

In some examples of the disclosed technology, it is desirable to perform data reordering (e.g., pixel reordering) using a limited amount of storage resources, for example, by buffering only two lines of a raster image. In some examples, line buffers can be of less width than the width of a corresponding raster image received from an image sensor. In some examples, data to be reordered is streamed, in other words, the input rate of data is approximately equal to the output rate of data as the reordering operations are performed. In some examples, data reordering can be performed using one buffer as long as there is sufficient idle time between received lines of data to process a current line of data. This is period of idle time is sometimes referred to as "blanking time." For example, it may take X microseconds to transmit the image using one camera serial interface (CSI) line. However, a re-order buffer may operate at 4 times the effective width of the bus; thus, if a reordering can be performed in a X/4 microsecond time period, then a single buffer can be used to perform the reorder operation.

The disclosed apparatus and methods support a number of different complex pixel reordering operations. There is a sequence of data ordering in the data that follows a regular pattern and can be efficiently processed using a relatively small set of buffers. In some examples, the data is sequenced according to two patterns concurrently. For example, a sequence of data is separated by a fixed amount, for example, a power of two, but at the same time, a second pattern of data ordering is exhibited, for example, data that is to be reordered is separated by a fixed amount. In some examples, the apparatus and methods are implemented in a pipelined fashion.

The disclosed technologies further allow for data reordering, for example pixel reordering, without direct use of a processor, (e.g., a central processing unit (CPU), graphics processing unit (GPU), or image signal processor (ISP)). In some examples, additional filtering operations can be performed on the data as it is passed between a series of buffers, as further discussed below.

III. Example Computing Environment with Data Reordering

FIG. 1 is a block diagram 100 outlining an exemplary computing environment in which certain apparatus and methods disclosed herein can be implemented. The computing environment outlined in FIG. 1 can be implemented within a single integrated circuit, or by coupling a number of different integrated circuits, including circuits having programmable logic devices (e.g., FPGAs), and circuits having sensor capabilities (e.g., image sensors or other sensors that can receive real world data).

As shown in FIG. 1, one or more processors 110 are coupled to main memory 120 via a system bus 130. The memory 120 can be embedded or external to the integrated circuit on which the one or more processors 110 are located, and can be implemented using any suitable memory technology including, for example, static random access memory (SRAM), dynamic random access memory (DRAM), flash memory, video RAM, or other suitable memory technology. In some examples, the memory includes a virtual memory system including computer readable storage devices such as flash memory drives, hard drives, or other mass storage devices.

The system bus 130 can be implemented using any suitable communication technology and includes connection technologies that allow multiples components to share the system bus, as well as other connection topologies where components communicate to each other using a point-to-point bus. Examples of protocols suitable for implementing the system bus 130 include DDR2, DDR3, DDR4, PCI, PCIe, I/OAT, AHB, or other suitable bus protocol.

Also shown in FIG. 1 is a data source 140 that generates data according to an order that will be reordered by the reorder unit 150. In some examples, the data source 140 receives data from, for example, an image sensor, using a PHY connector (e.g., a wired, wireless, optical, or other suitable physical connector) according to a MIPI protocol, and sends image data to the reorder unit 150. The data source can be the output of an image sensor, such as a charge coupled device (CCD), or complementary metal oxide semiconductor (CMOS) image sensor. In some examples, data from the data source 140 are received using an I/O interface while in other examples, the data source is directly coupled to the reorder unit 150. In some examples, the data source 140 performs additional processing on raw data, such as serial-to-parallel conversion and decoding of packets such that only image data is sent to the reorder unit 150. The additional processing can be performed using a link protocol manager. In some examples, the data source is located on a separate integrated circuit, or even a separate computer system than the illustrated computing environment 100.

The reorder unit 150 includes a set of input buffers 160, an addressable memory 170, and a set of output buffers 180. The input buffers 160 and the output buffers 180 can implement any suitable buffering configuration, for example, a first-in, first-out (FIFO) buffer implemented using a series of latches, a shift register, or a memory configured to act as a FIFO buffer. Similarly, the output buffers 180 can also be implemented using similar circuit structures as the input buffers 160. It is typically desirable for the input buffers 160 and the output buffers 180 to be able to operate at least as fast as the data rate of data received from the data source 140. The addressable memory 170 is addressed using the reorder unit 150 and can store a plurality of bits of data at each address using any suitable memory cell technology, for example, SRAM, DRAM, flash memory, latches, and/or a register file. In some examples, additional hardware is located between the data source and the input buffers, between the input buffers 160, the output buffers 180, and the memory 170 or at the output of the output buffers 180, to perform additional operations on data being processed.

IV. Example Reorder Unit

Figure 2:
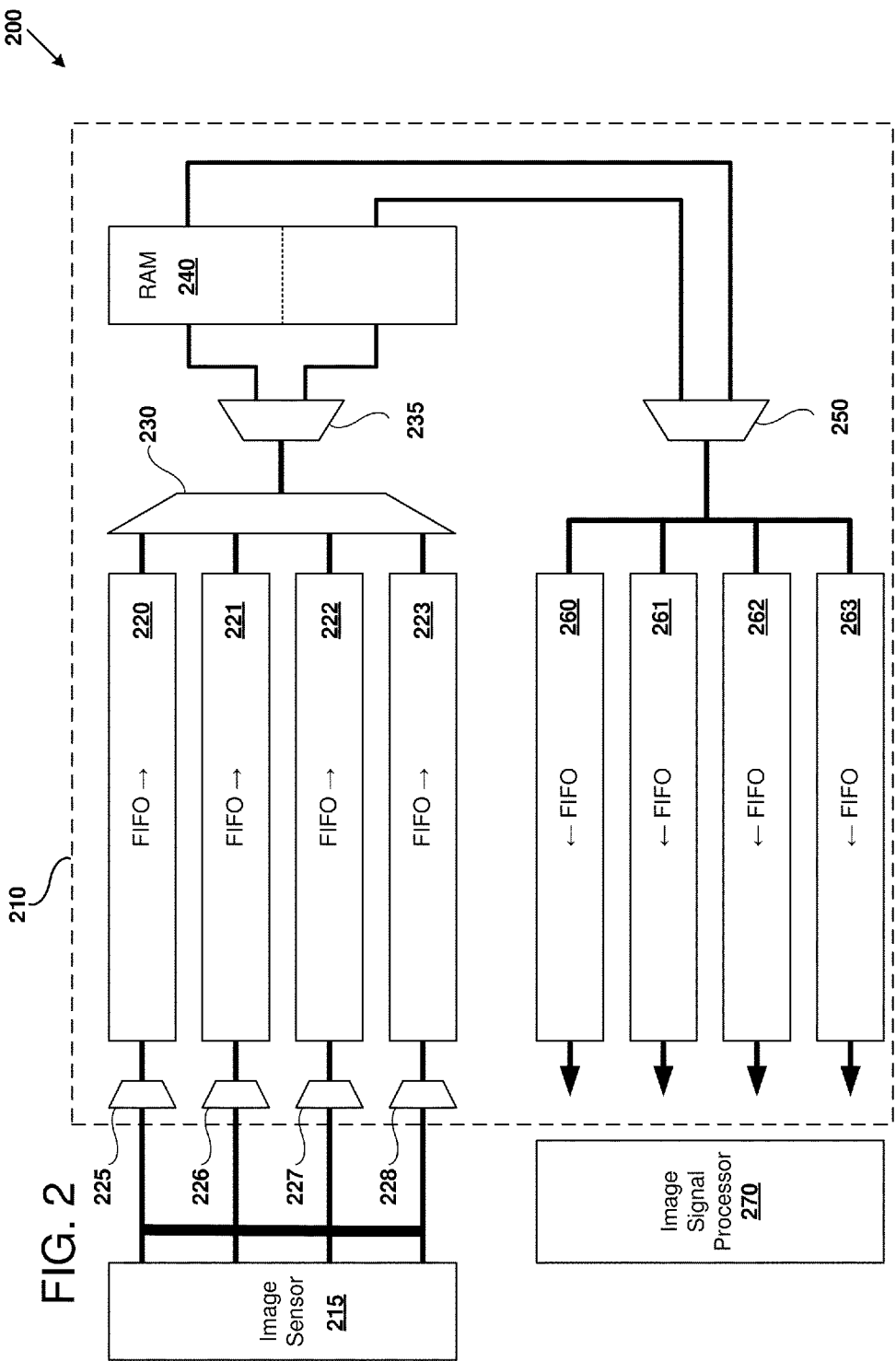
FIG. 2 is a block diagram that outlines example hardware, including a reorder unit, as can be used in certain examples of the disclosed technology.

FIG. 2 is a block diagram 200 illustrating an example configuration of a reorder unit 210 that is coupled to an image sensor 215. The image sensor can be implemented using any suitable technology, including CCD or CMOS image sensors. The image sensor 215 is coupled to four multi-bit wide FIFOs 220-223 via a number of multiplexers 225-228. The input FIFOs 220-223 are desirably configured to store and output data at a rate sufficient to handle the produced by the image sensor 215, without stalling. A multiplexer 230 is configured to the outputs of the FIFOs 220-223 in order to select outputs concurrently.

Also shown is a decoder 235 that can be used to address a RAM, for example, place data values in a low portion or a high portion of the RAM 240 (the portions being indicated by a dotted line). In certain examples, the data is produced as a series of 12-bit pixels in RGB format. Other suitable pixel formats can be used including RGB formats ranging from, for example, 12- to 24-bit pixels, YUV formats (e.g., YUV 420 and YUV 422), YCbCr 422, YCbCr 420 formats, or RAW formats including 6 to 14 bits. The data width of components within the reorder unit 210 can be then selected and sized accordingly. The reorder unit 210 includes logic for addressing the read addresses and write addresses of the RAM 240. The RAM 240 can be a multi-ported RAM, for example, a dual-read port/dual write-port RAM. The output of the RAM 240 is sent to a decoder 250 that sends data to one of the output FIFOs 260-263. The output from the output FIFOs 260-263 can then be sent to other consuming circuitry within a computing system, for example, by sending data to an image signal processor 270 or other component(s) using a system bus.

In some examples, the image signal processor 270 is a specialized digital signal processor (DSP) adapted for image processing functions including at least one or more of the following functions: Bayer transformation, demosaicing, noise reduction, and/or image sharpening. In some examples, the image signal processor 270 is a specialized digital signal processor (DSP) adapted for image processing functions including at least one or more of the following: contrast adjustments, thresholding, background subtraction, convolution, interpolation, and/or filtering. In some examples, the image signal processor 270 is implemented with a general purpose CPU or a GPU. In some example, the image signal processor 270 is implemented using reconfigurable logic, such as one or more FPGAs. In some examples, the reconfigurable logic is reconfigured on-the-fly to perform the desired image processing operations, while in other examples, the reconfigurable logic is configured a single time.

Both the input FIFOs and the output FIFOs receive data in a first-in, first-out fashion, that is, the first set of data for a pixel received by an input FIFO will be the first pixel of data that is output by the FIFO. In some examples, the FIFOs are implemented as a series of chained flip-flops, or a series of chained latches. In some examples, the FIFOs are implemented using a memory with additional logic for controlling the beginning and end locations of a buffer. In some examples, the FIFOs are implemented using shift registers, exclusive read/write FIFO buffers, or concurrent read/write FIFO buffers. In some examples, each of the FIFOs is a synchronous FIFO buffer or asynchronous FIFO buffer.

As will be readily understood to one of ordinary skill in the relevant art, the reorder unit 210 also includes control circuitry that can be used to manage operation of the components within the reorder unit, as well as to control data flow from the image sensor 215 and to consuming components that receive data from the output FIFOs. The control circuitry can be implemented using any suitable computing hardware, including but not limited to, hardwired finite state machines, programmable microcode, programmable gate arrays, or other suitable control circuits. In some examples, operation of the reorder unit 210 is pipelined using a number of pipeline registers arranged in between various components to allow for temporary storage of values in between individual clock cycles in a multiple cycle operation.

Further, while the example depicted in FIG. 2 illustrates an apparatus having four input FIFOs and four output FIFOs, as will be readily understood to one of ordinary skill in the art, the number of FIFOs can be reduced or increased to be adapted to a particular implementation of the disclosed technology. Further, for the examples shown, the number of bits for the input FIFOs 220-223 and the output FIFOs 260-263 is selected based at least in part on the write width(s) supported by the RAM 240, and vice versa. For example, configurations using eight input FIFOs will typically have a RAM with a write width that can accommodate output from all eight input FIFOs concurrently. Furthermore, two or more of the input FIFOs in some examples can be loaded simultaneously (e.g., one-half or all of the input FIFOs), while in other examples, each of the input FIFOs are loaded in a sequential order. Moreover, unless stated otherwise, each of the input FIFOs and output FIFOs output data in the same consecutive time order in which it was stored in the respective FIFO. However, each of the FIFOs can be operated independently, and there is not necessarily any constraint on the timing and/or order in which data is stored in two different respective FIFOs, unless used to effect operation of a particular implementation of a circuit.

V. Example Pixel Orderings

Figure 3:
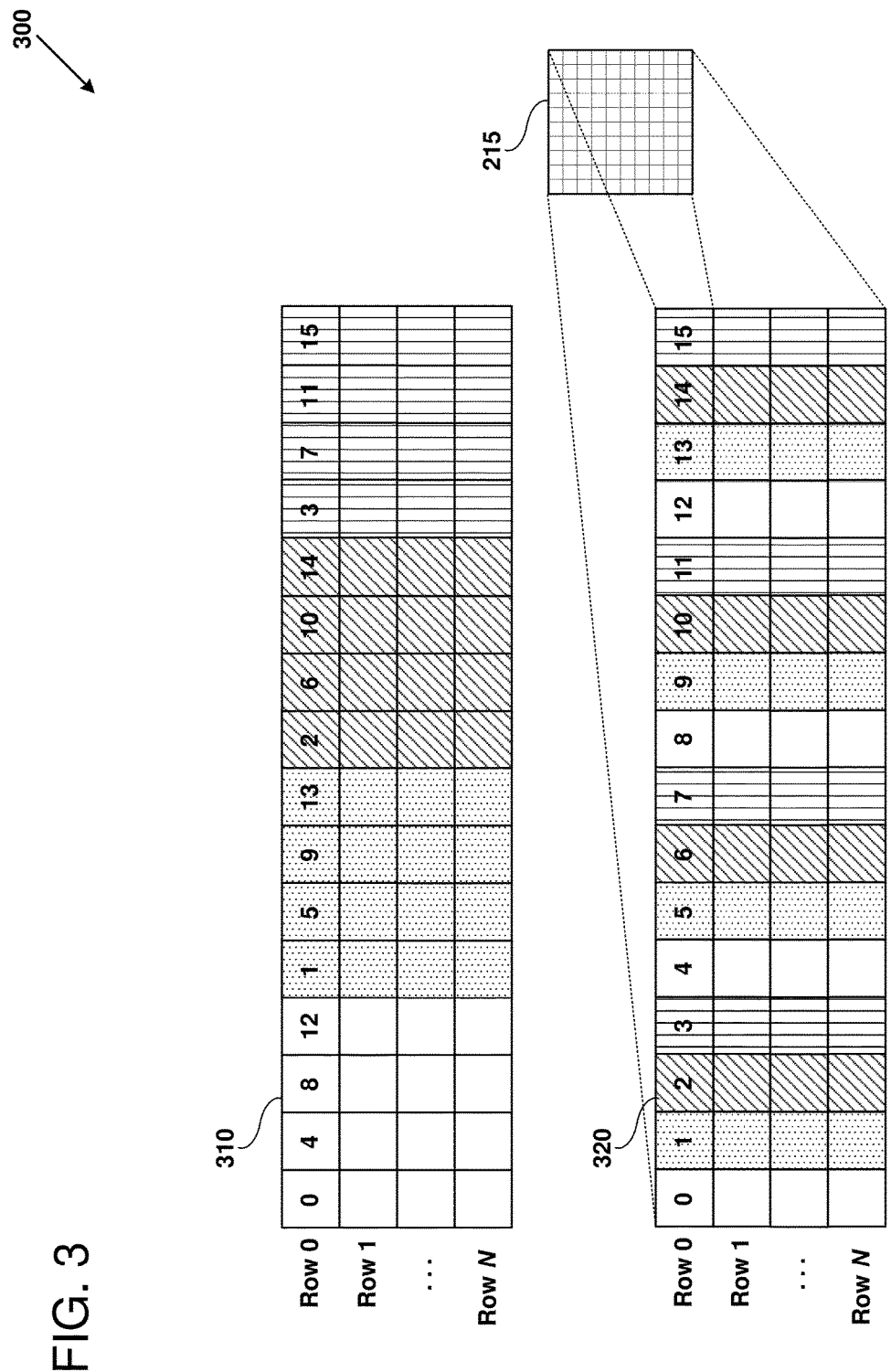
FIG. 3 is a diagram that illustrates non-contiguous and contiguous data, as can be processed in certain examples of the disclosed technology.

FIG. 3 is a diagram 300 illustrating pixel ordering for a number of pixels received from an image sensor. The first table 310 illustrates the arrangement of non-contiguous pixel data in the order in which it is received from the image sensor. The numerals indicate the order in which the pixels will be ordered according to their contiguous raster order. The ordering of pixels for each of the N rows shown (e.g., 385 rows) is the same. As shown, pixels are not received in the same order in which they are arranged in the raster image. Instead, the pixels are received in a regular, but noncontiguous order in a repeating/offset sequence of an even, power of two integer, 4: 0, 4, 8, 12, 1, 5, 9, 13, 2, and so forth. Input FIFO buffers can be used to temporarily store pixel data until it is reordered in the desired order.

A second table 320 illustrates the desired final ordering of the pixels according to their contiguous raster order: 0, 1, 2, 3, 4, 5, and so forth, in the order in which the reordered pixel data are output by the output FIFOs. Thus, as shown, the data exhibits a regular ordering that is exhibited for all of the pixels within a row. For ease of explanation, the illustrated pixels are shaded to indicate their corresponding order in the contiguous raster order, thus pixels 0, 4, 8, ..., N–3 are not shaded, pixels 1, 5, 9, ..., N–2 have a first shading pattern, pixels 2, 6, 10, ..., N–1 have a second shading pattern, and pixels 3, 7, 11, ..., N have a third shading pattern. A similar shading scheme is used in the following FIGS. 4, 7, and 8 to further detail operation of the disclosed methods and apparatus.

VI. Example Method of Reordering Data

Figure 4:
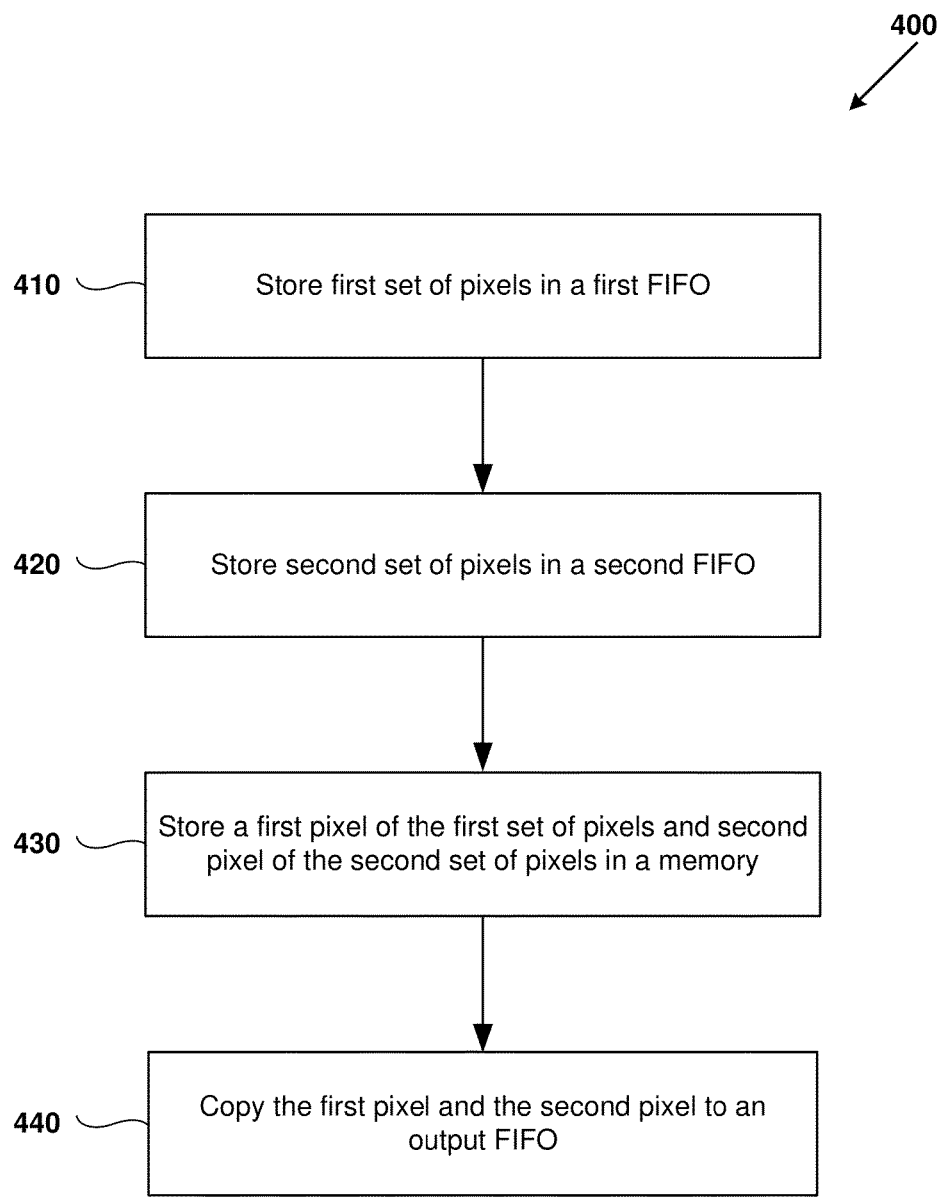
FIG. 4 is a flowchart outlining an example method of reordering data, as can be performed in certain examples of the disclosed technology.

FIG. 4 is a flowchart 400 outlining an example method of processing data such as pixel data, according to the disclosed technology. The method outlined in the flowchart 400 can be performed using a reorder unit such as the ones disclosed in the computing environment 100 discussed above regarding FIG. 1, and/or using the hardware outlined in the block diagram 200 of FIG. 2, although it will be readily apparent to one of ordinary skill in the relevant art that other configurations of hardware and/or software can be employed to perform the disclosed method.

At process block 410, a first set of pixels are stored. For example, a first set of data can include a number of pixels received in a non-contiguous order from an image sensor. The first set of pixels ranging from one up to N pixels are stored in a first FIFO. Once all N pixels have been stored in the first FIFO, the method proceeds to process block 420.

At process block 420, a second set of pixels is stored in a second input FIFO buffer. The number of pixels in this set is the same as the number of pixels stored in the first set at process block 410. After storing the second set of pixels in the second FIFO, the method proceeds to process block 430.

At process block 430, all of the input FIFOs (in this example, the two input FIFO buffers storing data at process blocks 410 and 420), have had a set of data stored in them. Thus, a first pixel of the first set of pixels can be output from the first input FIFO buffer, and a second set of pixels stored in the second input FIFO buffer are stored in a memory as at least a portion of a word at one address location of the memory. For example, a first pixel of a set of pixels stored in the input FIFO buffer 220 and a second pixel stored in a second input FIFO buffer 221 can be stored in the RAM 240 discussed above regarding FIG. 2. After storing the first and second pixels from the outputs of the input FIFO buffer, the method proceeds to process block 440.

At process block 440, the first pixel and the second pixel stored in the RAM are copied to one or more output FIFO buffers. Depending on the non-contiguous ordering of the pixel data received when practicing the illustrated method, the first pixel and the second pixel can be stored in one output FIFO buffer, or individual pixels can be stored in each of a plurality of two or more output FIFOs, depending on the particular reordering operation that is being performed.

It should be readily understood that a number of variations and modifications can be applied to the method outlined in the flow chart 400. For example, the data need not be pixel data received from an image sensor, but can include data received from other sources that is to be reordered. Further, the number of input FIFO buffers and output FIFO buffers can be varied depending on particular performance requirements of the method. In addition, it will be readily understood that the method can be implemented using control logic for controlling the flow of data into and out of the FIFO input buffers, the flow of data into and out of the RAM, and/or the flow of data into and out of the output FIFOs.

Figure 5:
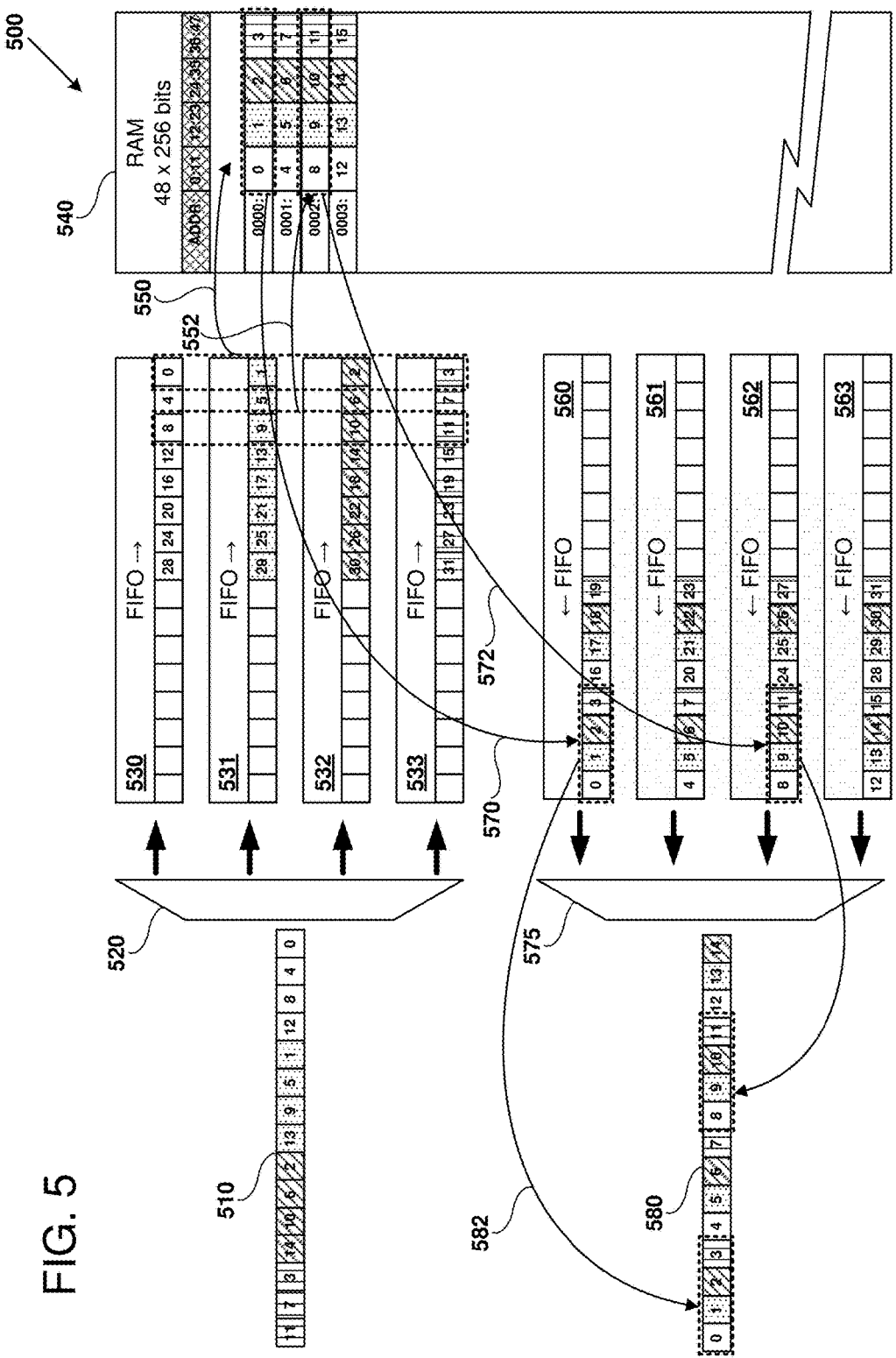
FIG. 5 is a diagram depicting reordering of data, as can be performed in certain examples of the disclosed technology.

FIG. 5 is a diagram illustrating data processing including reordering of the data shown in table 310. It should be readily understood that the diagram is for illustrative purposes only and does not necessarily show an actual snapshot of data at a particular point in time. Rather, the diagram 500 illustrates flow of the pixels as they are reordered using, for example, the reorder unit 210 discussed above at FIG. 2. As shown in FIG. 5, a series of pixels 510 are received according to a first, non-contiguous order: 0, 4, 8, 12, 1, and so forth. De-multiplexing logic 520 is controlled by control logic of the reorder unit to send individual pixels to one of a plurality of input FIFOs 530-533. Thus, as shown, the first four pixels received from the pixel stream 510 are sent to a first FIFO 530. The de-multiplexing circuit 520 then reconfigures to send the next four pixels of the pixel stream 510 to a second FIFO 531 (pixels numbers 1, 5, 9, 13). The de-multiplexing circuit 520 continues to send pixels from the pixel stream 510 to one of the corresponding FIFO's 530 to 533 in a regular fashion. For example, after storing four pixels in each of the four FIFOs 530 to 533, the de-multiplexing circuit 520 is reconfigured to store another four pixels (pixels 16, 20, 24, and 28) in the first FIFO 530.

Thus, a first subset of N pixels are stored in the first FIFO 530 before selecting a second FIFO 531 using the de-multiplexing circuit 520. In the example shown, the size of the subset is four pixels of data, that is pixels 0, 4, 8, and 12 form a first subset that is stored in the first FIFO 530 before proceeding to the second FIFO 531. The second FIFO 531 will store another N pixels (as shown, four pixels) numbered 1, 5, 9, 13. After storing the four pixels in the second FIFO 531, the de-multiplexer 520 is reconfigured to send pixel data to the third FIFO 532, where a third subset of pixel data will be stored, and then a fourth subset of pixel data will be stored in the fourth FIFO 533. After storing a subset of the pixel data in each of the input FIFOs 530-533, the de-multiplexer will be reconfigured to store an additional subset of pixels in the first FIFO 530, as shown, the pixels numbered 12, 16, 20, and 24.

Once each of the input FIFOs 530-533 stores data for at least one pixel, data from each of the FIFOs can be stored in an addressable memory, which is a random access memory (RAM) 540 of size 48 times 256 bits. As shown, the RAM 540 has 256 address locations, each of which store 48 bits of 12-bit pixel data received from the input FIFOs 530 to 533. A first set of pixels (0, 1, 2, 3), one pixel from the output of each of the input FIFOs, is stored at a first address location 0000 in the RAM, as indicated by a first arrow 550. A second set of pixels (4, 5, 6, 7) is stored at address location 0001, and a third set of pixels (8, 9, 10, 11) is stored at address location 0002, as indicated by a second arrow 552. It should be readily understood by one of ordinary skill in the relevant art that the operations of receiving a stream of input pixels 510, reconfiguring and sending data using the de-multiplexing circuit 520, storing and outputting data from the input FIFOs 530-533, and storing pixel data in the RAM 540 can occur at least in part, concurrently. For example, as pixel data from the stream of pixels 510 is being stored in one of the input FIFOs, pixel data can also be output from all of the input FIFOs and stored in the RAM 540. The address location at which input FIFO data is stored in the RAM is determined at least in part on the non-contiguous ordering of pixel data in the pixel stream 510. In the example shown in FIG. 5, the address location is incremented by one for each set of output pixels from the input FIFOs.

Once pixel data has been stored in the RAM, the pixel data can be output from the RAM and stored in two or more output FIFOs 560-563. As shown in FIG. 5, the pixel data (0, 1, 2, 3) stored at memory address 0000 is stored in the first output FIFO 560, as indicated by the first arrow 570. After outputting the pixel data from the first memory address 0000, the memory address is incremented to address 0001 and a next set of four pixels (4, 5, 6, 7) are stored in the second output FIFO 561. Then, the memory address is incremented to address 0002 and a third set of pixels are stored in a third output FIFO, as indicated by the second arrow 572.

In some examples of the disclosed technology, a different number of output FIFOs are used. For example, the example of FIG. 5 can be modified so that there are only one or two output FIFOs used to buffer data as it is output from the RAM 540. In some examples of the disclosed technology, the RAM 540 and/or one or more or all of the output FIFOs 560-563. Although such modifications may limit the ability of the components illustrated in the diagram 500 to efficiently process more complicated pixel orderings, the modified arrangements can be employed on less complicated pixel orderings in accordance with the techniques disclosed herein.

Once a number of pixels have been stored in the output FIFOs, the pixels can be output to the rest of the system for further processing in a contiguous order (e.g., as a stream of pixels 580 in raster order). In the illustrated example, four pixels in a row (0, 1, 2, 3) are output from the first output FIFO 560 with the use of a multiplexing circuit 575, as indicated by an arrow 582. The multiplexing circuit is then reconfigured to read four pixels in a row (4, 5, 6, 7) from the second output FIFO 561, and so forth. The multiplexing circuit 575 outputs the stream of pixels 580 in the order depicted in FIG. 5.

In other examples, data stored as a word in the RAM is not distributed amongst the output FIFOs, but instead is streamed to one of the output FIFOs as a subset of FIFO output data. In some examples, additional processing of the pixel data can be performed, for example as data is copied from the pixel stream 510 to the input FIFOs 530-533, as data is copied from the input FIFOs to the RAM 540, and/or as pixel data is copied from the RAM to the output FIFOs. One example of such processing that can occur is a conversion of floating point data to fixed point data, although a number of other possible transformations are possible. In some examples, one or more of the input FIFOs 530-533, RAM 540, and/or output FIFOs 560 can by bypassed or omitted, depending on the complexity of the reordering being applied to the stream of pixels.

VII. Example Method of Reordering Pixel Data

Figure 6:
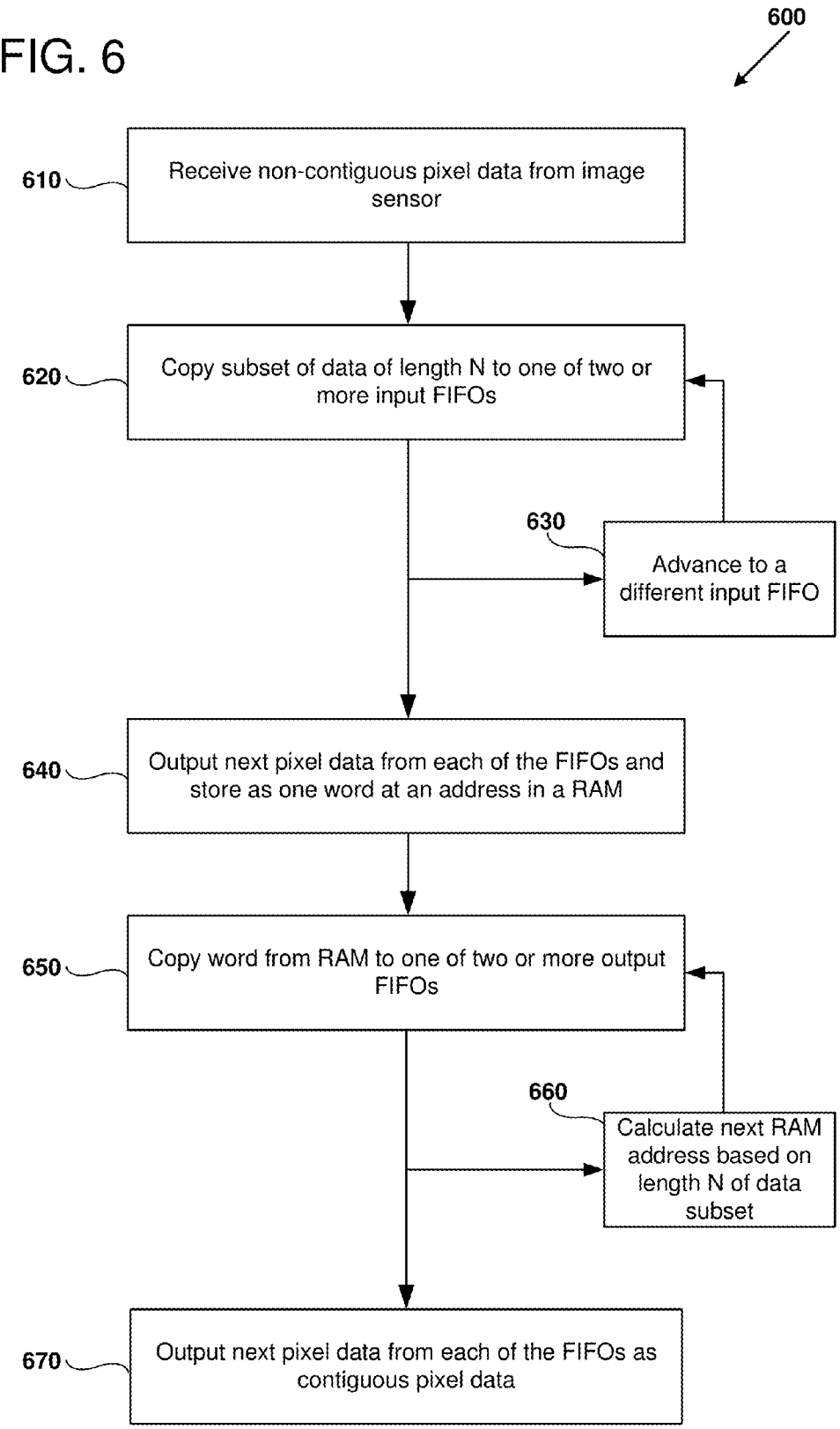
FIG. 6 is a flowchart outlining an example method of reordering pixel data received from an image sensor, as can be performed in certain examples of the disclosed technology.

FIG. 6 is a flowchart 600 outlining an exemplary method of reordering pixel data as can be performed in certain examples of the disclosed technology. For example, the method outlined in FIG. 6 can be implemented using the computer hardware discussed above regarding FIG. 1 and/or FIG. 2.

At process block 610, a series of non-contiguous pixel data are received from an image sensor, for example image sensor 215. The ordering of the pixel data can be according to a number of different non-contiguous patterns, but is repeated in one or more ways. Examples of non-contiguous ordering of data are discussed above regarding FIGS. 3 and 7 and are shown in table 310 and table 710, although other non-contiguous orderings can be processed using the disclosed method. Once at least a portion of the non-contiguous pixel data is received from the image sensor, the method proceeds to process block 620.

At process block 620, a subset of the non-contiguous pixel data of length N is copied to one of two or more input FIFOs. For example, as shown in FIG. 5, the subset is four pixels in length (e.g., 48 bits, if 12-bit pixels are used), while in FIG. 8, the subset is nine pixels in length (e.g., 108 bits, if 12-bit pixels are used). Once a subset of length N has been copied to one of the input FIFOs, the method proceeds to process block 630 in order to advance the selected input FIFO to a different input FIFO. For example, when copying data to the input FIFOs 220-223 of reorder unit 210, the FIFOs can be selected in the order: 220, 221, 222, 223, 220, 221, etc. Once a different input FIFO has been selected, the method proceeds to process block 620. After each of a plurality of FIFOs includes a subset of the data, the method can concurrently proceed to process block 640. In other words, in certain examples, the received pixel data is stored in the input FIFOs, while concurrently being output by the input FIFOs to the RAM at process block 640.

At process block 640, the next pixel data from each of the FIFOs is output and stored as one word at an address location in a memory, for example a RAM. Thus, each of the input FIFOs can output a pixel of data concurrently and store it in a word of memory. The number of pixels stored in the RAM can be varied based on the width of the RAM, which width can range from one pixel up to the number of pixels in a row (e.g., 287 or more pixels). After storing at least one word of pixel data at an address in the memory, the method proceeds to process block 650.

At process block 650, a word of data is copied from the RAM to at least one of two or more output FIFO buffers. In some examples, a number of pixels stored as one word are output to a single one of the output FIFOs, while in other examples, one of the pixels is sent to a respective each one of the output FIFOs, depending on the non-contiguous ordering of the pixel data. After copying a word of pixels from the RAM, the method proceeds to process block 660 in order to calculate a next RAM address for copying data to the output buffers based at least in part on a length of the data subset. After calculating the next RAM address, the method proceeds back to process block 650. For the example shown in FIG. 5, the next RAM address is incremented by one location, while for the example discussed in FIG. 8, the memory address is incremented by 18. Once enough data are copied from the RAM to the output FIFOs to allow output of contiguous pixel data, the method proceeds to process block 670. It should be readily understood that the calculating of RAM addresses can occur concurrently as data is copied from the RAM to the output FIFOs.

At process block 670, data from the output FIFOs is output as contiguous pixel data. For the examples shown in FIG. 5 and FIG. 8, one pixel is output from each of the four illustrated output FIFO buffers, and ordered into a contiguous stream of pixel data. Thus, it should be understood that a number of operations described in the process blocks of the flowchart 600 can occur concurrently while pixel data is being received and reordered according to the described operations.

VIII. Example Pixel Ordering

Figure 7:
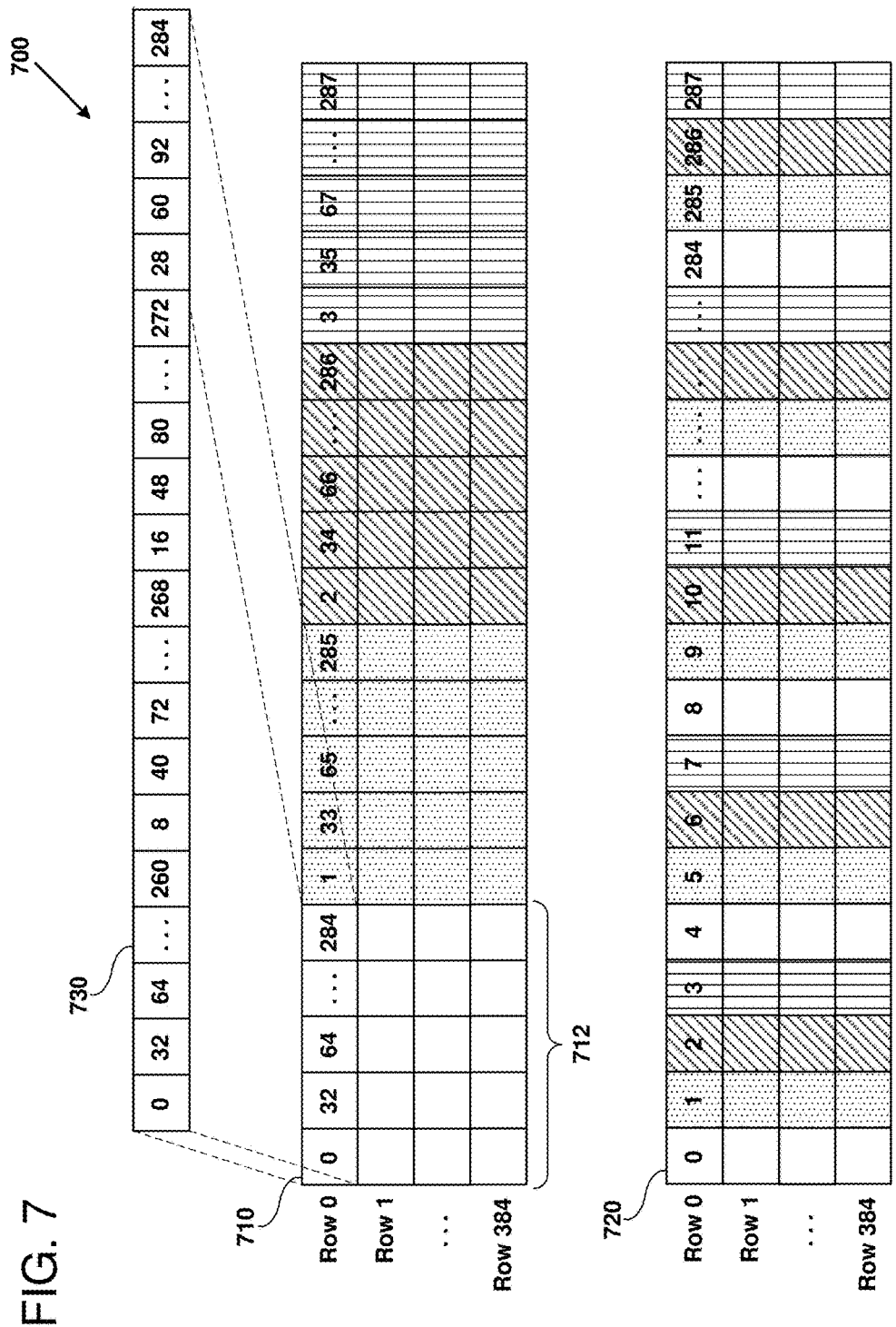
FIG. 7 is a diagram outlining another example of non-contiguous and contiguous data, as can be processed according to certain examples of the disclosed technology.

FIG. 7 is a diagram 700 illustrating a more complex non-contiguous ordering of pixel data received from an image sensor than the non-contiguous data illustrated in the example of FIG. 3 above. As shown in FIG. 7, a first table 710 indicates a non-contiguous ordering of a stream of pixels 730 as they are received from an image sensor: 0, 32, 64, . . . , 216, 8, 40, 72, . . . , 268, . . . , 284, 1, and so forth. In particular, the non-contiguous order of the pixels is repeated in a first arithmetic sequence according to an integer power of two (e.g., x=32) but the first sequence is repeated and an increment s (e.g., s=4) is added to a starting base number b (e.g., $t_0$=b=0) after an odd number (e.g., y=9) of terms $t_0, t_1, t_2, \ldots t_N$ of the first arithmetic sequence are produced: $t_0$=b, $t_1$=b+x, $t_2$=b+2x, $t_3$=b+3x, $t_4$=b+4x, $t_5$=b+5x, $t_6$=b+6x, $t_7$=b+7x, $t_8$=b+8x (e.g., $t_0$=0, $t_1$=32, $t_2$=64, $t_3$=96, $t_4$=128, $t_5$=160, $t_6$=192, $t_7$=224, $t_8$=256); the second y (nine) terms: $t_9$=b+s, $t_{10}$=b+s+x, $t_{11}$=b+s+2x, $t_{12}$=b+s+3x, $t_{13}$=b+s+4x, $t_{14}$=b+s+5x, $t_{15}$=b+s+6x, $t_{16}$=b+s+7x, $t_{17}$=b+s+8x (e.g., $t_9$=4, $t_{10}$=36, $t_{11}$=68, $t_{12}$=100, $t_{13}$=132, $t_{14}$=164, $t_{15}$=196, $t_{16}$=228, $t_{17}$=260; etc. In the example sequence, after a first one-fourth of the terms 712 for a row are produced, the sequence repeats again, but offset from a base number of 1: (e.g., $t_{72}$=1, $t_{73}$=33, $t_{74}$=65, etc.). Thus, an example non-contiguous ordering according to complex sequence based on an odd number of terms, the terms incrementing by an even number, is produced. In some examples, a non-contiguous order of the pixels is further determined based on a third parameter for adjusting the order of the sequence.

Thus, the pixels are ordered according to a complex, yet predictable, pattern which otherwise can be difficult to reorder into a contiguous ordering efficiently and/or without the use of extensive hardware resources. For example, pixel 3 is not received until three-fourths of the data from the image sensor has been received. A second table 720 shows the pixel data after being reordered into a contiguous ordering. It should be noted that the ordering of pixels for a row is the same for each of the 385 rows shown in FIG. 7. It should also be noted that, while the pixel data of FIG. 7 is shown as data for a complete row of a raster image, in other examples the data may be received as a portion of a row, for example one-half or one-quarter of a row of pixel data. In such cases, the data can be processed using similar techniques, but adapted for the particular presentation of the image data.

IX. Example Reordering of Pixel Data

Figure 8:
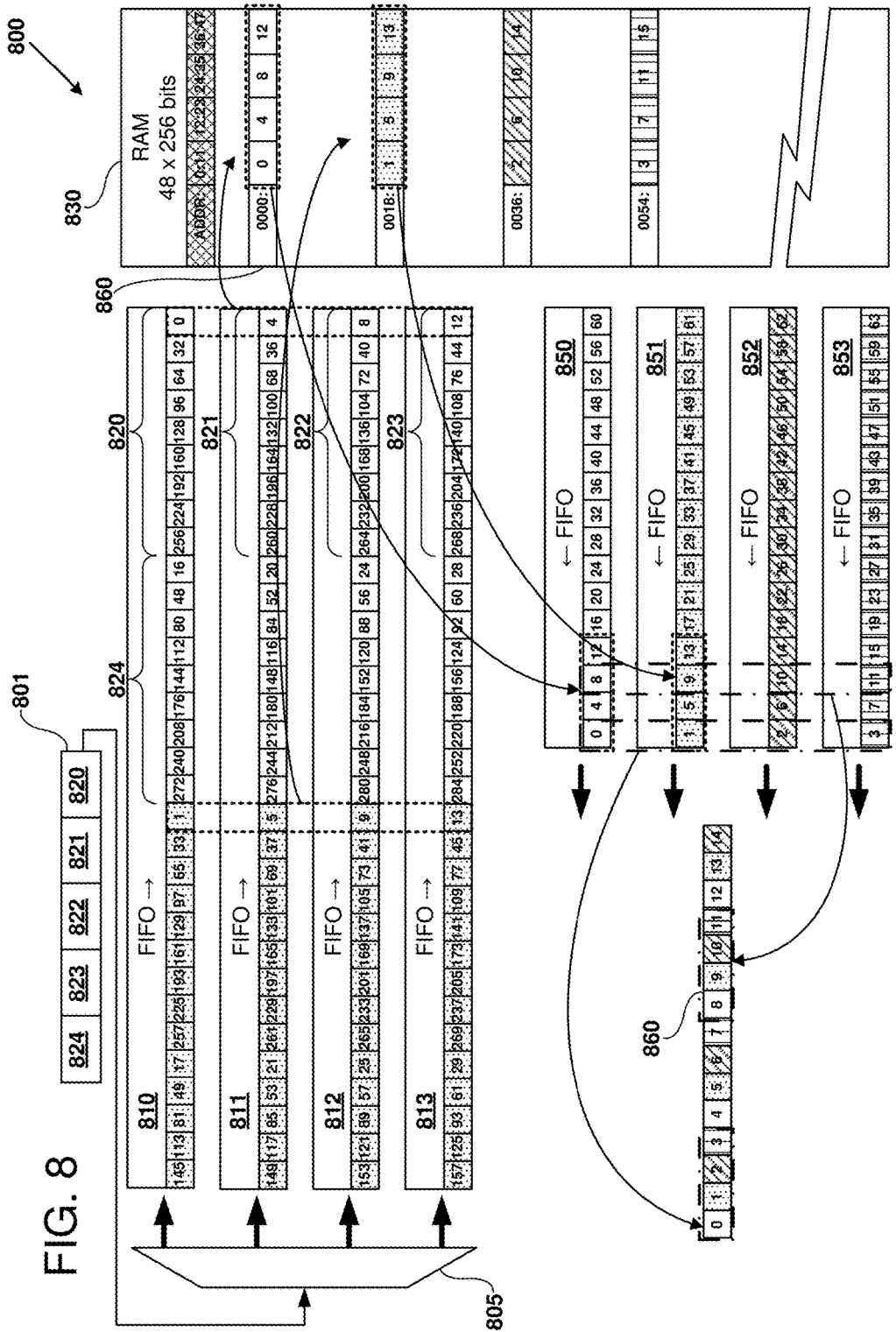
FIG. 8 is a diagram depicting processing of non-contiguous pixel data, as can be performed according to certain examples of the disclosed technology.

FIG. 8 is a diagram 800 depicting an example of processing pixel data received according to the non-contiguous ordering shown in the table 710 of FIG. 7. As shown, a series of pixel data 801 is received in a non-contiguous order. De-multiplexing logic 805 is controlled by control logic of the reorder unit to send individual pixels to one of a plurality of input FIFOs 811-813. A first set of nine pixels from the pixel data 801 is directed by the de-multiplexing logic 805 to be stored in the first FIFO in a nine pixel wide chunk 820, including pixels numbered 0, 32, 64, 96, 128, 160, 192, 224, and 256. After these first nine pixels are received, the de-multiplexing logic 805 is reconfigured and the input pixel stream is redirected to the second input FIFO 811 and another nine pixels of data (including pixels 4 and 260 as indicated by reference numeral 821) are copied to the second input FIFO 811. A next nine pixels of data 822 are stored in a FIFO 812 and another nine pixels of data 823 are stored in the third input FIFO 813. The next pixels bits of pixel data starting with pixel number 16 are then stored in the first input FIFO 810. Once a number of pixel data are stored in each of the input FIFOs 810-813, the reorder unit can begin to copy another nine pixels of data 824 from the output of the input FIFOs to a RAM 830. Each set of individual pixels output by the input FIFOs are stored as one word of data in the RAM. As shown, a first four pixels, numbers 0, 4, 8, and 12 are stored as a first word at memory address 0000. Next, the pixels 32, 36, 40, and 44 will be stored at a next memory address 0001. The memory address will continue to advance for each pixel output by the input FIFOs 810-813.

Once pixel data has been stored in the RAM, the data can be concurrently output to one of the one or more output FIFOs 850-853. For example, as shown in FIG. 8, a first word of pixel data including pixels 0, 4, 8, 12 is stored in the first output FIFO 850 as indicated by the arrow 860. Next, the output memory address location is incremented to memory address 0018 (not memory address 0001) and a second word of pixel data (four pixels 1, 5, 9, and 13) are stored in the second output FIFO 851. The memory address is then incremented to address location 0036 and the pixel data stored at that address are stored in output FIFO 852, and the pixel stored at memory address 0054 is stored in the fourth output FIFO. Once pixel data has been stored in each of the output FIFOs 850-853, the output FIFOs can begin sending pixel data to other portions of the system. As shown in FIG. 8, one pixel from each of the output FIFOs 850-853 can be output concurrently, thereby producing contiguous reordered pixel data 860 in the order 0, 1, 2, 3, 4. A second set of pixels 4, 5, 6, 7 can then be read from the output FIFOs 850-853, and so on.

For ease of explanation, certain multiplexing and other circuitry coupling the FIFOs and RAM are omitted from FIG. 8. Further, the components depicted in FIG. 8 can be readily adapted to other orders of pixel sequences using control circuitry to configure the manner and number of data that are read into and read out of the input FIFOs, RAM, and/or output FIFOs. As will be readily understood to one of ordinary skill in the relevant art, many of the operations depicted in FIG. 8 can be performed concurrently. It should also be understood that while individual pixels are shown as being stored in multiple locations at once, for ease of presentation, that the FIFOs and RAM are operated continuously, and thus data is removed or shifted during actual operation of a circuit implementing the operations depicted in FIG. 8.

X. Example Computing System

Figure 9:
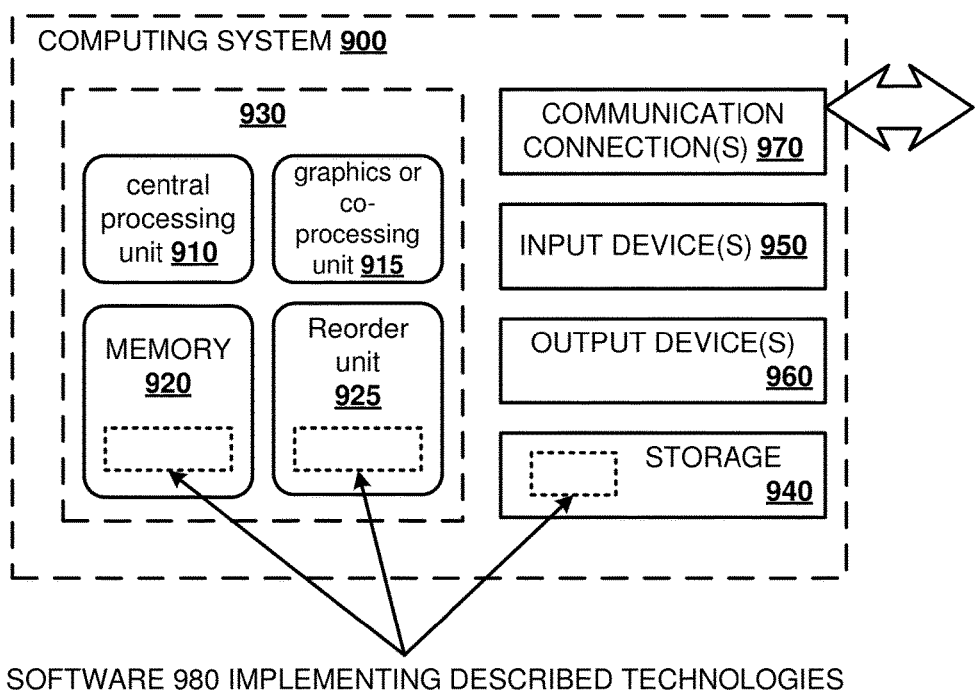
FIG. 9 is a diagram of an example computing system in which some described embodiments can be implemented.

FIG. 9 depicts a generalized example of a suitable computing system 900 in which the described innovations may be implemented. The computing system 900 is not intended to suggest any limitation as to scope of use or functionality, as the innovations may be implemented in diverse general-purpose or special-purpose computing systems.

With reference to FIG. 9, the computing system 900 includes one or more processing units 910, 915, a reorder unit 920, and memory 925. In FIG. 9, this basic configuration 930 is included within a dashed line. The processing units 910, 915 execute computer-executable instructions, including instructions for implementing direct memory access (DMA) with filtering disclosed herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 925 may be volatile memory (e.g., registers, cache, RAM), non-volatile memory (e.g., ROM, EEPROM, flash memory, etc.), or some combination of the two, accessible by the processing unit(s). The memory 925 stores software 980 implementing one or more innovations described herein, in the form of computer-executable instructions suitable for execution by the processing unit(s).

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM, CD-RW, DVD, or Blu-Ray that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

XI. Example Mobile Device

Figure 10:
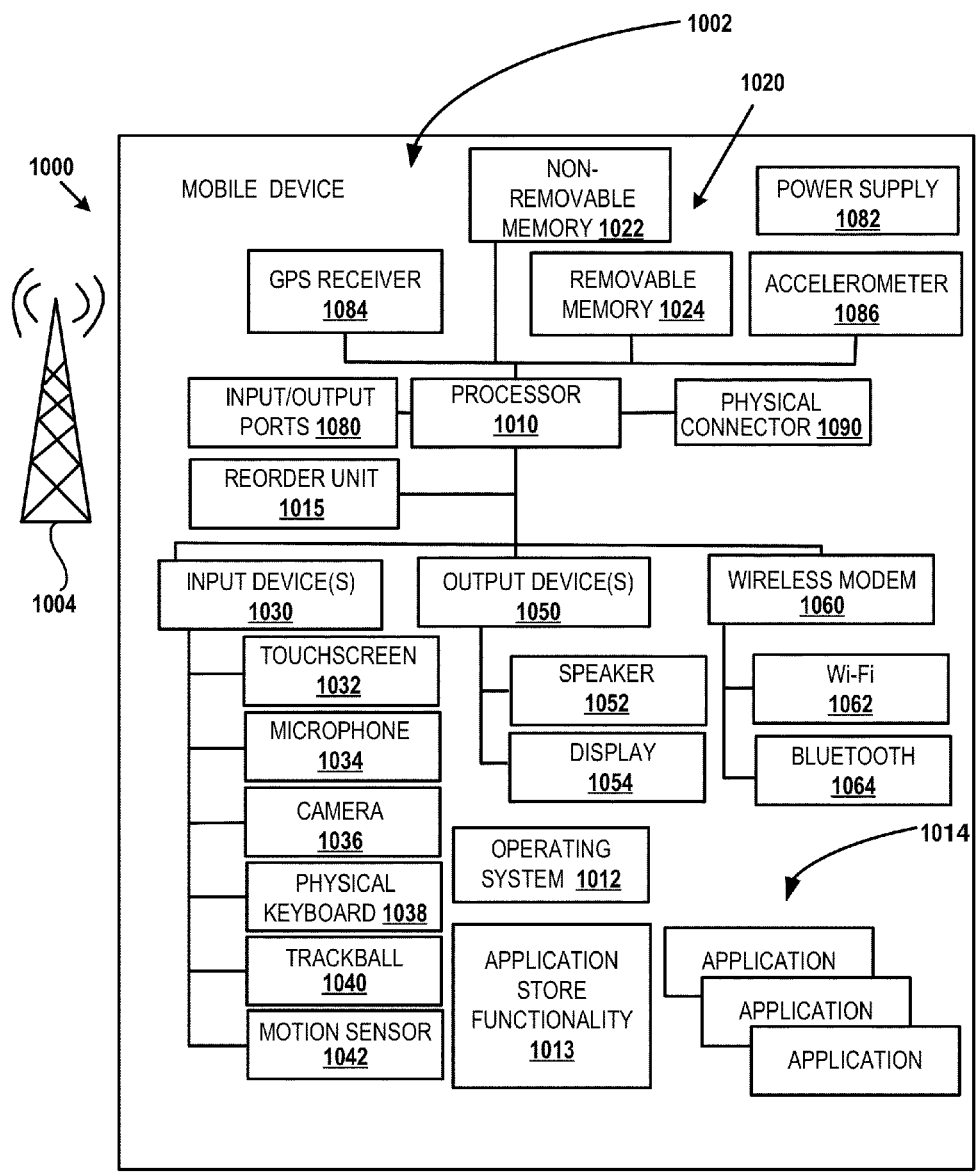
FIG. 10 is an example mobile device that can be used in conjunction with at least some of the technologies described herein.

FIG. 10 is a system diagram depicting an example mobile device 1000 including a variety of optional hardware and software components, shown generally at 1002. Any components 1002 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1004, such as a cellular, satellite, or other network.

The illustrated mobile device 1000 can include a controller or processor 1010 (e.g., signal processor, microprocessor, ASIC, or other control and processing logic circuitry) for performing such tasks as signal coding, data processing, input/output processing, power control, and/or other functions, including instructions for implementing DMA with filtering disclosed herein. An operating system 1012 can control the allocation and usage of the components 1002 and support for one or more application programs 1014. The application programs can include common mobile computing applications (e.g., email applications, calendars, contact managers, web browsers, messaging applications), or any other computing application. Functionality 1013 for accessing an application store can also be used for acquiring and updating application programs 1014. The illustrated mobile device 1000 can include a reorder unit 1015, which can be implemented using, for example, FIFO buffers and memory.

The illustrated mobile device 1000 can include memory 1020. Memory 1020 can include non-removable memory 1022 and/or removable memory 1024. The non-removable memory 1022 can include RAM, ROM, flash memory, a hard disk, or other well-known memory storage technologies. The removable memory 1024 can include flash memory or a Subscriber Identity Module (SIM) card, which is well known in GSM communication systems, or other well-known memory storage technologies, such as "smart cards." The memory 1020 can be used for storing data and/or code for running the operating system 1012 and the applications 1014. Example data can include web pages, text, images, sound files, video data, or other data sets to be sent to and/or received from one or more network servers or other devices via one or more wired or wireless networks. The memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1000 can support one or more input devices 1030, such as a touchscreen 1032, microphone 1034, camera 1036, physical keyboard 1038, trackball 1040, and/or motion sensor 1042; and one or more output devices 1050, such as a speaker 1052 and a display 1054. Other possible output devices (not shown) can include piezoelectric or other haptic output devices. Some devices can serve more than one input/output function. For example, touchscreen 1032 and display 1054 can be combined in a single input/output device.

The input devices 1030 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3-D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1012 or applications 1014 can comprise speech-recognition software as part of a voice user interface that allows a user to operate the device 1000 via voice commands. Further, the device 1000 can comprise input devices and software that allows for user interaction via a user's spatial gestures, such as detecting and interpreting gestures to provide input to a gaming application.

A wireless modem 1060 can be coupled to an antenna (not shown) and can support two-way communications between the processor 1010 and external devices, as is well understood in the art. The modem 1060 is shown generically and can include a cellular modem for communicating with the mobile communication network 1004 and/or other radio-based modems (e.g., Bluetooth 1064 or Wi-Fi 1062). The wireless modem 1060 is typically configured for communication with one or more cellular networks, such as a GSM network for data and voice communications within a single cellular network, between cellular networks, or between the mobile device and a public switched telephone network (PSTN).

The mobile device can further include at least one input/output port 1080, a power supply 1082, a satellite navigation system receiver 1084, such as a Global Positioning System (GPS) receiver, an accelerometer 1086, and/or a physical connector 1090, which can be a USB port, IEEE 1394 (FireWire) port, and/or RS-232 port. The illustrated components 1002 are not required or all-inclusive, as any components can be deleted and other components can be added.

XII. Example Cloud-Supported Environment

Figure 11:
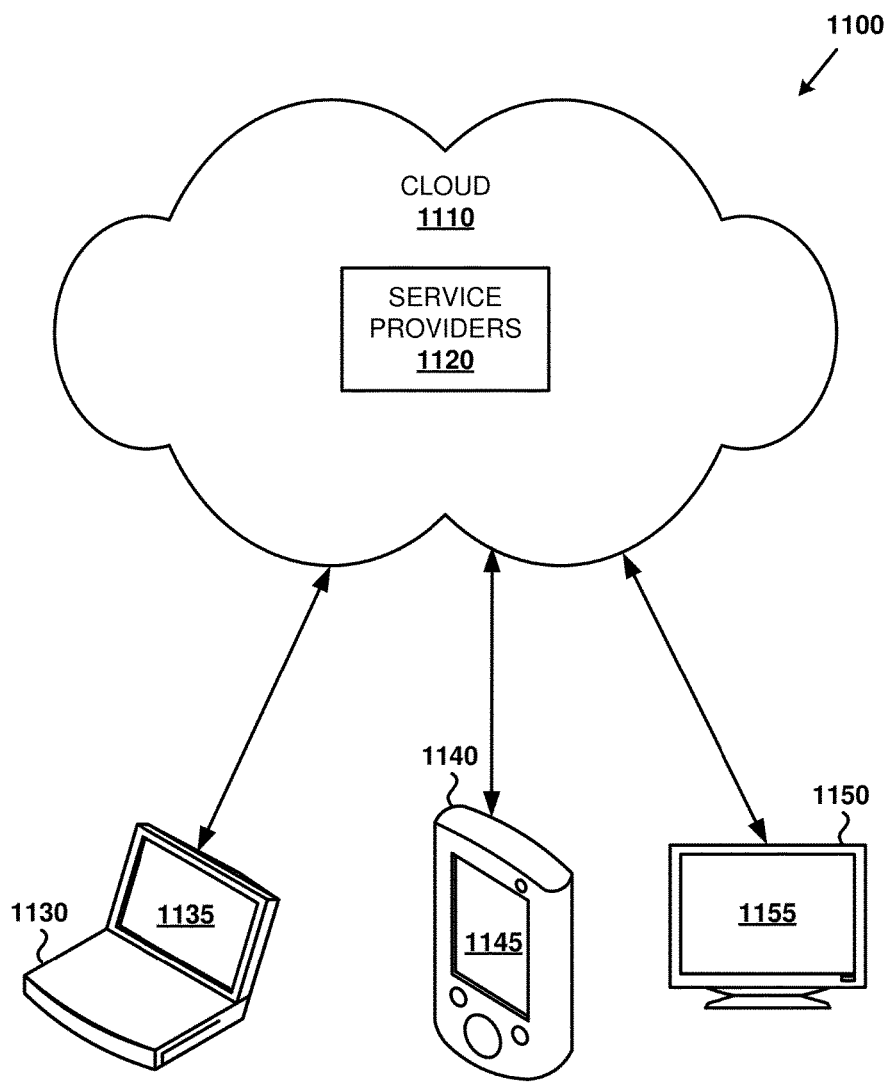
FIG. 11 is an example cloud-support environment that can be used in conjunction with at least some of the technologies described herein.

FIG. 11 illustrates a generalized example of a suitable cloud-supported environment 1100 in which described embodiments, techniques, and technologies may be implemented. In the example environment 1100, various types of services (e.g., computing services) are provided by a cloud 1110. For example, the cloud 1110 can comprise a collection of computing devices, which may be located centrally or distributed, that provide cloud-based services to various types of users and devices connected via a network such as the Internet. The implementation environment 1100 can be used in different ways to accomplish computing tasks. For example, some tasks (e.g., pixel reordering, processing user input, and presenting a user interface) can be performed on local computing devices (e.g., connected devices 1130, 1140, 1150) while other tasks (e.g., storage of data to be used in subsequent processing) can be performed in the cloud 1110.

In example environment 1100, the cloud 1110 provides services for connected devices 1130, 1140, 1150 with a variety of screen capabilities. Connected device 1130 represents a device with a computer screen 1135 (e.g., a mid-size screen). For example, connected device 1130 could be a personal computer such as desktop computer, laptop, notebook, netbook, or the like. Connected device 1140 represents a device with a mobile device screen 1145 (e.g., a small size screen). For example, connected device 1140 could be a mobile phone, smart phone, personal digital assistant, tablet computer, and the like. Connected device 1150 represents a device with a large screen 1155. For example, connected device 1150 could be a television screen (e.g., a smart television) or another device connected to a television (e.g., a set-top box or gaming console) or the like. One or more of the connected devices 1130, 1140, and/or 1150 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touchscreen capability of a particular connected device (e.g., connected devices 1130, 1140, 1150).

In example environment 1100, the cloud 1110 provides the technologies and solutions described herein to the various connected devices 1130, 1140, 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users).

XIII. Additional Examples According to the Disclosed Technology

Additional examples are disclosed herein in accordance with the examples disclosed above.

In certain examples of the disclosed technology, an example apparatus is configured to reorder data received from a data stream into a contiguous ordering, the data being arranged according to a first ordering, the apparatus including a reorder unit. In some examples, the reorder unit includes a plurality of input buffers including a first input buffer and a second input buffer, each of the input buffers being configured to output data stored by the respective input buffer in a first-in first-out order, and a memory, where the reorder unit is configured to store a first portion of the received data in the first input buffer, the first portion including a first plurality of data units, store a second portion of the received data in the second input buffer, the second portion comprising a second plurality of data units, and store a first data unit of a first portion output by the first input buffer and a second data unit of a second portion output by the second input buffer at a first address location in the memory.

In some examples, the apparatus further includes a plurality of output buffers, each of the output buffers being configured to output data stored by the respective output buffer in a respective first-in first-out order, and the reorder unit is further configured to store the first data unit and the second data unit output from the memory in a first one of the output buffers, thereby producing reordered data. In some examples, the reorder unit is further configured to store a third data unit of the first portion and fourth data unit of the second portion at a second address location in the memory, and store the third data unit and the fourth data unit in a second one of the output buffers.

In some examples, control circuitry is used to manage operation of the components within the reorder unit, as well as to control data flow from a data source (e.g., an image sensor) and to consuming components (e.g., an image signal processor or other suitable processor) that receive data from the output FIFOs. The control circuitry can be implemented using any suitable computing hardware, including but not limited to, hardwired finite state machines, programmable microcode, programmable gate arrays, or other suitable control circuits. In some examples, operation of the reorder unit is pipelined using a number of pipeline registers arranged in between various components to allow for temporary storage of values in between individual clock cycles in a multiple cycle operation.

In some examples of the disclosed technology, all or some of the buffers are FIFO buffers implemented using circuitry including as at least one or more of the following: a series of chained latches, a series of chained flip-flops, and/or a static random access memory (SRAM). In some examples, all or some of the buffers are implemented as at least one or more of the following: shift registers, exclusive read/write FIFO buffers, and/or concurrent read/write FIFO buffers, and the buffers are synchronous FIFO buffers and/or asynchronous FIFO buffers.

In some examples, the apparatus further includes one or more image sensors being configured to generate the received data as a series of pixels in a non-contiguous order, and each of the data units corresponds to a pixel of the series of pixels. In some examples, the reorder unit is operable to be reconfigured to reorder data received in a second ordering different than the first ordering into a contiguous ordering.

In certain examples of the disclosed technology, an example apparatus is configured to reorder non-contiguous pixel data into a contiguous ordering, the apparatus including a plurality of first-in first-out (FIFO) input buffers and a reordering unit configured to reorder the non-contiguous pixel data into a contiguous pixel stream by storing respective portions of the pixel data in each of the FIFO input buffers and selecting a respective pixel concurrently output by each of the FIFO input buffers.

In some examples, the apparatus further includes an addressable memory and a plurality of FIFO output buffers, each of a set of the selected pixels concurrently output are stored as a word in the memory, and a word of pixels stored in the memory are output from the reorder unit using the plurality of FIFO output buffers.

In some examples, the non-contiguous pixel data is ordered according to complex sequence based on an odd number of terms, the terms of the sequence being incremented by an even number. For example, the terms of the sequence are incremented by four for nine terms, before the order is repeated (plus an offset).

In some examples, the reordering unit is configured to store a first set of pixels in a first one of the FIFO input buffers, store a second set of pixels in a second one of the FIFO input buffers, and store a first respective pixel output by each of the FIFO input buffers at a first address location of an addressable memory.

In some examples, an apparatus further includes a sensor coupled to the FIFO input buffers, the sensor being configured to produce the non-contiguous pixel data.

In certain examples of the disclosed technology, a method of reordering a stream of pixel data having a non-contiguous ordering into a contiguous ordering includes storing a first set of pixels from the stream in a first input FIFO, storing a second set of pixels from the stream in a second input FIFO, storing a first pixel of the first set of pixels output by the first input FIFO and a second pixel of the second set of pixels output by the second input FIFO in a memory at a first address location, copying the first pixel and the second pixel to an output FIFO buffer from the memory, and outputting the first pixel and the second pixel from the output FIFO buffer according to a contiguous ordering.

In some examples, the method further includes generating the stream of pixel data using an image sensor, the image sensor being configured to output the pixel data according to the non-contiguous ordering, wherein the contiguous ordering corresponds to a relative physical ordering of pixel sensors in the image sensor.

In some examples, the first set of pixels and the second set of pixels are included in a first row of pixels, the pixels being stored in first portion of the memory, and the method further includes repeating the acts of storing and outputting for the first row of pixels, and repeating the acts of storing and outputting for a second row of pixels, each of the second row of pixels being stored in a different portion of the memory than the first row of pixels.

In some examples, the method includes storing a third pixel of the first set of pixels output by the first input FIFO and a fourth pixel of the second set of pixels output by the second input FIFO in a memory at a second address location, and copying the third pixel and the fourth pixel to an output FIFO buffer from the second address location of the memory.

In some examples, the first address location and the second address location are determined based at least in part on a relative ordering of the first and second pixels to the third and fourth pixels in the respective input FIFOs.

In some example, the non-contiguous ordering is a first ordering, and the method further comprises repeating each of the acts of storing, copying, and outputting for a pixel stream having a non-contiguous ordering in a different ordering than the first ordering.

In some examples of the disclosed technology, one or more computer-readable storage media store computer-readable instructions that when executed by a processor coupled to a reorder unit, causes the processor to perform any of the methods disclosed herein. Further, such computer-readable storage media can be used to at least partially control the operation of the exemplary apparatus disclosed herein.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims and their equivalents.

We claim:

1. An apparatus configured to reorder data received from a data stream into a contiguous ordering, the data being arranged according to a first ordering, the apparatus comprising:
   a plurality of input buffers comprising a first input buffer and a second input buffer, each of the input buffers being configured to output data stored by the respective input buffer in a first-in first-out order;
   an addressable memory;
   a plurality of output buffers, each of the output buffers being configured to output data stored by the respective output buffer in a respective first-in first-out order; and
   control circuitry configured to cause the apparatus to:
      store a first portion of the received data in the first input buffer, the first portion comprising a first plurality of data units,
      store a second portion of the received data in the second input buffer, the second portion comprising a second plurality of data units,
      store a first data unit of a first portion output by the first input buffer and a second data unit of a second portion output by the second input buffer at a first address location in the addressable memory, and
      store the first data unit and the second data unit output from the memory in a first one of the output buffers, thereby producing reordered data.

2. The apparatus of claim 1, wherein the control circuitry is further configured to cause the apparatus to:
   store a third data unit of the first portion and a fourth data unit of the second portion at a second address location in the memory; and
   store the third data unit and the fourth data unit in a second one of the output buffers.

3. The apparatus of claim 1, wherein each of the buffers are FIFO buffers implemented using circuitry including at least one or more of the following: a series of chained latches, a series of chained flip-flops, or a static random access memory (SRAM).

4. The apparatus of claim 1, wherein each of the buffers are implemented as at least one or more of the following: shift registers or FIFO buffers, and wherein each of the buffers are a synchronous FIFO buffer or an asynchronous FIFO buffer.

5. The apparatus of claim 1, further comprising an image sensor, wherein the image sensor is configured to generate the received data as a series of pixels in a non-contiguous order, and wherein each of the data units corresponds to a pixel of the series of pixels.

6. An apparatus configured to reorder data received from a data stream into a contiguous ordering, the data being arranged according to a first ordering, the apparatus comprising:
   a plurality of input buffers comprising a first input buffer and a second input buffer, each of the input buffers being configured to output data stored by the respective input buffer in a first-in first-out order;
   an addressable memory;
   control circuitry configured to cause the apparatus to:
      store a first portion of the received data in the first input buffer, the first portion comprising a first plurality of data units,
      store a second portion of the received data in the second input buffer, the second portion comprising a second plurality of data units,
      store a first data unit of a first portion output by the first input buffer and a second data unit of a second portion output by the second input buffer at a first address location in the addressable memory, wherein the control circuitry is operable to be reconfigured to reorder data received in a second ordering different than the first ordering into a contiguous ordering.

7. The apparatus of claim 6, further comprising:
   a plurality of output buffers, each of the output buffers being configured to output data stored by the respective output buffer in a respective first-in first-out order; and
   wherein the control circuitry is further configured to cause the apparatus to:
      store the first data unit and the second data unit output from the memory in a first one of the output buffers, thereby producing reordered data.

8. The apparatus of claim 6, wherein the control circuitry is further configured to cause the apparatus to:
   store a third data unit of the first portion and a fourth data unit of the second portion at a second address location in the memory; and
   store the third data unit and the fourth data unit in a second one of the output buffers.

9. The apparatus of claim 6, wherein each of the buffers are FIFO buffers implemented using circuitry including at least one or more of the following: a series of chained latches, a series of chained flip-flops, or a static random access memory (SRAM).

10. The apparatus of claim 6, wherein each of the buffers are implemented as at least one or more of the following: shift registers or FIFO buffers, and wherein each of the buffers are a synchronous FIFO buffer or an asynchronous FIFO buffer.

11. The apparatus of claim 6, further comprising an image sensor, wherein the image sensor is configured to generate the received data as a series of pixels in a non-contiguous order, and wherein each of the data units corresponds to a pixel of the series of pixels.

12. An apparatus configured to reorder non-contiguous pixel data into a contiguous ordering, the apparatus comprising:
  an addressable memory;
  a plurality of first-in first-out (FIFO) input buffers; and
  logic configured to cause the apparatus to reorder the non-contiguous pixel data into a contiguous pixel stream by:
    storing respective portions of the pixel data in each of the FIFO input buffers and selecting a respective pixel concurrently output by each of the FIFO input buffers, and
    storing a set of the selected pixels as a word in the addressable memory.

13. The apparatus of claim 12, further comprising:
  a plurality of FIFO output buffers, wherein the word of pixels stored in the memory are output using the plurality of FIFO output buffers.

14. The apparatus of claim 12, wherein the non-contiguous pixel data is ordered according to a complex sequence based on an odd number of terms, the terms of the sequence being incremented by an even number.

15. The apparatus of claim 12, wherein the logic comprises reorder unit means for reordering the received pixel data into the contiguous pixel stream.

16. The apparatus of claim 12, wherein the logic is further configured to cause the apparatus to:
  store a first set of pixels in a first one of the FIFO input buffers;
  store a second set of pixels in a second one of the FIFO input buffers; and
  store a first respective pixel output by each of the FIFO input buffers at a first address location of an addressable memory.

17. The apparatus of claim 12, further comprising a sensor coupled to the FIFO input buffers, the sensor being configured to produce the non-contiguous pixel data.

18. A method of reordering a stream of pixel data having a non-contiguous ordering into a contiguous ordering, the method comprising:
  storing a first set of pixels from the stream in a first input FIFO;
  storing a second set of pixels from the stream in a second input FIFO;
  storing a first pixel of the first set of pixels output by the first input FIFO and a second pixel of the second set of pixels output by the second input FIFO in a memory at a first address location;
  copying the first pixel and the second pixel to an output FIFO buffer from the memory; and
  outputting the first pixel and the second pixel from the output FIFO buffer according to a contiguous ordering.

19. The method of claim 18, further comprising generating the stream of pixel data using an image sensor, the image sensor being configured to output the pixel data according to the non-contiguous ordering, wherein the contiguous ordering corresponds to a relative physical ordering of pixel sensors in the image sensor.

20. The method of claim 18, wherein the first set of pixels and the second set of pixels are included in a first row of pixels, the pixels being stored in first portion of the memory, the method further comprising:
  repeating the acts of storing and outputting for the first row of pixels; and
  repeating the acts of storing and outputting for a second row of pixels, each of the second row of pixels being stored in a different portion of the memory than the first row of pixels.

21. The method of claim 18, further comprising:
  storing a third pixel of the first set of pixels output by the first input FIFO and a fourth pixel of the second set of pixels output by the second input FIFO in a memory at a second address location; and
  copying the third pixel and the fourth pixel to an output FIFO buffer from the second address location of the memory.

22. The method of claim 21, wherein the first address location and the second address location are determined based at least in part on a relative ordering of the first and second pixels to the third and fourth pixels in the respective input FIFOs.

23. The method of claim 18, wherein the non-contiguous ordering is a first ordering, and wherein the method further comprises:
  repeating each of the acts of storing, copying, and outputting for a pixel stream having a non-contiguous ordering in a different ordering than the first ordering.

24. One or more computer-readable storage devices or memory storing computer-readable instructions that when executed by a processor coupled to reorder unit means, causes the processor to perform the method of claim 18.

* * * * *